(12) United States Patent
Zeulner et al.

(10) Patent No.: US 11,155,033 B2
(45) Date of Patent: Oct. 26, 2021

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Fabian Zeulner, Lichtenfels (DE); Stephan Hunze, Pirna (DE)

(73) Assignee: Concept Laser GmbH, Lichtenfels (DE)

( * ) Notice: Subject to any disclaimer, the term of this patent is extended or adjusted under 35 U.S.C. 154(b) by 172 days.

(21) Appl. No.: 16/189,399

(22) Filed: Nov. 13, 2018

(65) Prior Publication Data

US 2019/0240906 A1 Aug. 8, 2019

(30) Foreign Application Priority Data

Feb. 7, 2018 (EP) ..................................... 18155597

(51) Int. Cl.
*B29C 64/268* (2017.01)
*B33Y 30/00* (2015.01)
(Continued)

(52) U.S. Cl.
CPC ............ *B29C 64/268* (2017.08); *B22F 12/00* (2021.01); *B28B 1/001* (2013.01); *B29C 64/386* (2017.08);
(Continued)

(58) Field of Classification Search
CPC ... B29C 64/268; B29C 64/153; B29C 64/386; B33Y 50/00; B33Y 30/00; B33Y 10/00;
(Continued)

(56) References Cited

U.S. PATENT DOCUMENTS 5,166,505 A 11/1992 Gorriz et al.
6,646,728 B1 11/2003 Tang et al.
(Continued)

FOREIGN PATENT DOCUMENTS

DE 102016001355 A1 8/2017
EP 3241668 A1 11/2017
(Continued)

OTHER PUBLICATIONS

Edmund Optics, application note, "Off-Axis Parabolic Mirror Selection Guide" (published on Aug. 1, 2014, available at https://www.edmundoptics.com/knowledge-center/application-notes/optics/off-axis-parabolic-mirror-selection-guide/(Year: 2014).*
(Continued)

*Primary Examiner* — Leith S Shafi
*Assistant Examiner* — Inja Song
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy beam (5) that is guided inside a process chamber (6) of the apparatus (1), wherein a determination device (7, 8) is provided that is arranged inside the process chamber (6) and adapted to determine at least one parameter of the energy beam (5), preferably during an additive manufacturing process, in particular during a process step of the additive manufacturing process in which build material (3) is applied onto a build plane (11) of the apparatus (1).

18 Claims, 2 Drawing Sheets

(51) Int. Cl.
*B28B 1/00* (2006.01)
*B33Y 50/00* (2015.01)
*B29C 64/386* (2017.01)
*B22F 12/00* (2021.01)
*B33Y 10/00* (2015.01)
*B22F 10/10* (2021.01)

(52) U.S. Cl.
CPC .............. *B33Y 30/00* (2014.12); *B33Y 50/00* (2014.12); *B22F 10/10* (2021.01); *B33Y 10/00* (2014.12)

(58) Field of Classification Search
CPC ....................... B22F 3/1055; B22F 2003/1056; B22F 12/00; B28B 1/001; Y02P 10/25; B23K 26/02; G01J 5/06
See application file for complete search history.

(56) References Cited

U.S. PATENT DOCUMENTS

| | | | |
|---|---|---|---|
| 2016/0144571 A1 | 5/2016 | Philippi | |
| 2018/0056390 A1* | 3/2018 | O'Neill | B23K 26/082 |
| 2018/0178449 A1* | 6/2018 | Cheverton | B23K 26/342 |
| 2018/0185959 A1* | 7/2018 | Mathews, Jr. | B23K 26/342 |
| 2018/0186082 A1* | 7/2018 | Randhawa | B23K 26/125 |
| 2018/0215102 A1* | 8/2018 | Amaya | B29C 64/268 |
| 2019/0070788 A1 | 3/2019 | Roesgen et al. | |
| 2019/0217422 A1 | 7/2019 | Kramer et al. | |

FOREIGN PATENT DOCUMENTS

| | | | |
|---|---|---|---|
| EP | 3278962 A1 | 2/2018 | |
| JP | S6240984 A | 2/1987 | |
| JP | H04226417 A | 8/1992 | |
| JP | H08318574 A | 12/1996 | |
| JP | 3155168 B2 | 4/2001 | |
| JP | 2013/544201 A | 12/2013 | |
| JP | 2019/514754 A | 6/2019 | |
| WO | 2012074986 A1 | 6/2012 | |
| WO | 2017212619 A1 | 12/2017 | |

OTHER PUBLICATIONS

Edmund Optics, application note, "Off-Axis Parabolic Mirror Selection Guide," a proof of publication date on Aug. 1, 2014, available at https://www.edmundoptics.com/knowledge-center/application-notes/optics/ (Year: 2014).*

European Search Report Corresponding to Application No. 1815597 dated Aug. 1, 2018.

Machine Translated Japanese Search Report Corresponding to Application No. 2018214411 dated Nov. 8, 2019.

Machine Translated Japanese Office Action Corresponding to Application No. 2018214411 dated Nov. 29, 2019.

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 155 597.0 filed Feb. 7, 2018, the contents of which is incorporated herein by reference in its entirety as if set forth verbatim.

BACKGROUND

The invention relates to an apparatus for additively manufacturing three-dimensional objects by means of successive layerwise selective irradiation and consolidation of layers of a build material which can be consolidated by means of an energy beam that is guided inside a process chamber of the apparatus.

Apparatuses for additively manufacturing of three-dimensional objects via successive layerwise selective irradiation of a build material are generally known from prior art. Such apparatuses use, for example, energy beams to selectively irradiate layers of build material which build material consolidates due to the energy depletion resulting from the irradiation with the energy beam. To achieve a defined object quality and process quality, it is further known, that parameters of the energy beam have to be monitored, such as optical parameters.

Typically, determination devices are used to monitor parameters of the energy beam, for example cameras that are arranged outside the process chamber, i.e. the chamber in which the additive manufacturing process takes place, wherein the determination device monitors the build plane in which the energy beam directly irradiates the build material. To verify whether an optical parameter is properly adjusted, test irradiations can be performed, in which defined patterns are irradiated, for example onto a metal sheet. Afterwards, the quality of the patterns can be monitored to verify whether the object quality and/or process quality is properly met.

Said test irradiations are time and work consuming and can further not be performed during an additive manufacturing process, as the test specimen, for example the metal sheet, has to be inserted into the process chamber and removed afterwards to analyze the irradiated patterns.

BRIEF SUMMARY

It is an object of the present invention to provide an apparatus for additively manufacturing of three-dimensional objects, wherein the object and/or process quality, in particular the determination of at least one parameter of the energy beam, is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which the application of build material and the consolidation of build material are performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the inventive apparatus comprises a determination device which is provided for determining at least one parameter of the energy beam. Dependent on the determined parameter, of course, multiple adjustments can be made to the additive manufacturing process. For example, a focal position of the energy beam directly relates to the energy that is depleted in the build material. If deviations in the focal position, in particular deviations from a nominal focal position, occur in the additive manufacturing process, regions of the build plane or different layers or parts thereof, are irradiated with different energies (per area). This results in inhomogeneities over the object, for example inhomogene mechanical properties of the object. Thus, the determination device is provided for determining the parameter of the object, such as the focal position, to ensure that defined nominal values of the parameter are properly met, in particular during the additive manufacturing process.

The invention is based on the idea that the determination device is arranged inside the process chamber and adapted to determine at least one parameter of the energy beam, preferably during an additive manufacturing process, in particular during a process step of the additive manufacturing process in which build material is applied onto a build plane of the apparatus. In general, the at least one parameter of the energy beam may be any arbitrary parameter of the energy beam, in particular an optical parameter of the energy beam. For example, a focal position and/or a lateral position of the energy beam can be determined.

Advantageously, the determination of the at least one parameter of the energy beam can be performed during an additive manufacturing process. Hence, it is not necessary to arrange a test specimen inside the process chamber onto which a defined irradiation pattern is irradiated, which can afterwards be analyzed. Instead, the at least one parameter of the energy beam can be determined and monitored during the additive manufacturing process providing a potential "live feed" or a monitoring of the at least one parameter during the additive manufacturing process, respectively. Deviations from a nominal value of the parameter that occur during an additive manufacturing process can therefore, be determined and instantly compensated/adjusted accordingly.

It is also possible that the determination device is built as separate device which can be separably connected to the apparatus, in particular arranged in the process chamber of the apparatus for the determination process. Afterwards, the determination device may be disconnected from the apparatus and removed from the process chamber. Thus, the determination device may be connected to the apparatus to perform the determination process and does not have to be integrated in the apparatus.

It is particularly preferred, that the determination of the at least one parameter of the energy beam is performed during a process step of the additive manufacturing process in which build material is applied onto the build plane of the apparatus. Thus, the energy beam can be used to irradiate build material in the irradiation step, wherein the determination of the at least one parameter of the energy beam is performed in an application step. Thus, writing time or beam time, respectively, in which the energy beam can be used to irradiate build material is not wasted, as the at least one parameter of the energy beam is determined in a process step of the additive manufacturing process in which the energy beam is not used (idle). Typically, in application steps, the energy beam is blanked or switched off, to allow for an application unit to apply fresh build material onto the build plane. After the application step is finished, the next irradiation step can be performed.

According to an embodiment of the present invention, the determination device may comprise a beam splitter which is adapted to split the energy beam into a first and a second sub-part, wherein the beam splitter is further adapted to guide the first sub-part to a first determination unit and the second sub-part to a second determination unit. Thus, the energy beam is split into two sub-parts, in particular a first sub-part and a second sub-part via the beam splitter. Subsequent to the splitting of the energy beam into its two sub-parts, the respective sub-part is guided to a corresponding determination unit. For example, the first sub-part may be guided to a first determination unit, whereas the second sub-part is guided to a second determination unit. The determination units, i.e. the first determination unit and the second determination unit, are adapted to determine the at least one parameter of the energy beam.

Advantageously, two different parameters of the energy beam may be determined from the different sub-parts of the energy beam. In other words, the energy beam that is split into the first and the second sub-part may be analyzed with regard to different (optical) parameters. This allows for monitoring different parameters of the same energy beam simultaneously, in particular during an additive manufacturing process, as described before.

Preferably, the first determination unit may be adapted to determine a focal position of the energy beam and the second determination unit may be adapted to determine a lateral position, in particular a position in the x- and y-plane, of the energy beam. The x- and y-plane may also be referred to the plane in which the build plane is arranged, i.e. the plane in which build material is irradiated. According to this embodiment of the inventive apparatus, the focal position and the lateral position of the energy beam can simultaneously be determined and/or monitored using the first determination unit and the second determination unit. In other words, the energy beam is split into the first and the second sub-part, as described before, wherein the respective sub-parts are guided to the first and the second determination unit, which are adapted to determine the corresponding (optical) parameter of the energy beam, in particular the focal position and the lateral position.

The term "lateral position" of the energy beam according to the present application may refer to a position of the energy beam in the build plane, i.e. in the x- and y-plane. The term may particularly refer to a possible deviation from a nominal lateral position of the energy beam. In other words, as the energy beam is guided in the build plane, the actual position may deviate from a nominal position. The "lateral position" of the energy beam may refer to such a deviation, wherein the actual position of the energy beam can be determined and compared with the nominal position to verify whether the energy beam is properly adjusted and guided in the build plane or whether a deviation occurs and the energy beam has to be adjusted accordingly.

The second determination unit of the determination device may comprise a sensor element, in particular a quadrant photo diode, adapted to determine a (relative) lateral position of the energy beam and/or a deviation from a nominal position. The sensor element is therefore, adapted to determine the lateral position of the energy beam with respect to a defined nominal position. In the specific embodiment with the sensor element being a quadrant photo diode, the sensor element comprises multiple sections, in particular four sections, wherein the sensor element is adapted to identify onto which of the sections the energy beam is at least partially incident. Thus, if the nominal position is identified as the center of the sensor element, in particular the point of the sensor element in which the four quadrants intersect/contact, the relative position of the energy beam relative to the nominal position can be identified. Of course, an arbitrary other amount of sections can also be used. It is also possible to determine the amount of energy that is depleted via the energy beam in each section (determine the ratio to which the energy beam is incident on the individual sections) and therefore, to identify to which ratio the energy beam is incident on the respective section. Thus, it is possible to equalize the amount of energy incident on each section to ensure that the energy beam is properly guided to the nominal position, in particular the center of the sensor element.

According to another embodiment of the inventive apparatus, the first determination unit may comprise a collimating unit, preferably a mirror, in particular an off-axis parabolic mirror, adapted to collimate the first sub-part towards a detector of the first determination unit. Hence, deviant from usual methods for determining the focal position of the energy beam, a collimating unit is used to collimate the energy beam, in particular before or behind the focal position (in energy beam propagating direction). Thus, the collimating unit collimates the diverging energy beam, which diverges from (or towards) the focal position, and guides the (at least partly) collimated energy beam towards the detector of the first determination unit. In particular, the energy beam propagates towards the determination device, wherein the energy beam is at first split into the first sub-part and the second sub-part, wherein the first sub-part is guided towards the collimating unit, preferably the off-axis parabolic mirror, via which it is collimated and guided towards the detector of the first determination unit.

The determination unit may further comprise a focusing unit, in particular a focusing lens, which is adapted to focus the collimated first sub-part onto a detector of the first determination unit. Via the signal generated by the detector upon the first sub-part being incident on the detector, a determination can be made, whether the energy beam is properly focused or, whether a deviation from a nominal focal position is present. It is possible to perform an intensity measurement or a comparison of the spot size of the sub-part that is incident on the detector to verify whether the nominal focal position is met. The term "focusing onto a detector" does not necessarily involve that the focal position of the sub-part lies in the detector plane. It is also possible that the focusing unit focuses the first sub-part of the energy beam propagating towards the detector, wherein the focal position can deviate from the detector plane, in particular lie between the focusing unit and the detector.

Thus, after the energy beam is split into the first and the second sub-part, the first sub-part is preferably incident on the collimating unit that collimates the first sub-part towards the detector of the first determination unit. Before the first sub-part is incident on the detector, the focusing unit focuses the first sub-part, wherein the focal position of the first sub-part may lie in a different position as in the detector plane.

The inventive apparatus can further be improved in that the first determination unit may comprise an optical filtering unit, in particular an aperture, which is adapted to filter at least one part of the first sub-part with a defined focal position deviating from a nominal focal position. In particular, the optical filtering unit may be arranged in the nominal focal position of the first sub-part (the focal position of the sub-part if the nominal position of the energy beam is met), i.e. between the focusing unit and the detector. Thus, after the collimated first sub-part of the energy beam is again focused via the focusing unit, the (properly adjusted) first sub-part of the energy beam passes the optical filtering unit and is incident on the detector. For example, the focal position of the first sub-part may lie in the plane in which the optical filtering unit is arranged.

Thus, if the actual focal position of the energy beam deviates from the nominal focal position, the focal position of the first sub-part will shift in that the focal position of the first sub-part will not be positioned in its nominal position, too. Thus, at least one part of the first sub-part will be filtered via the optical filtering unit. By performing a corresponding determination, for example of a spot diameter of the sub-part on the detector or an intensity measurement, conclusions can be drawn to whether the energy beam is properly focused.

The apparatus for additively manufacturing of three-dimensional objects can further be improved in that the first determination unit may be adapted to perform a maximum detection procedure to determine the at least one parameter, in particular the focal position of the energy beam or a deviation from a nominal focal position. Thus, the actual focal position of the energy beam can be varied, wherein the focal position of the first sub-part of the energy beam will vary accordingly. As described before, it is possible to arrange an optical filtering unit in the beam path of the first sub-part of the energy beam that is adapted to filter parts of the first sub-part, if the energy beam is not properly focused. Hence, a maximum intensity of the first sub-part that is incident on the detector of the first determination unit is met, if the first sub-part is properly focused and therefore, the energy beam is properly focused as well.

In other words, the focal position of the energy beam can be varied, wherein a maximum of the intensity that is measured via the detector of the first determination unit may indicate the focal position in which the energy beam meets the nominal value of the focal position.

According to another embodiment of the inventive apparatus, the determination device may be fixedly or movably arranged, preferably fixedly arranged in a defined position inside the process chamber or movably arranged on an application unit of the apparatus, in particular an application element, such as a coater. Thus, the determination device, in particular the first and the second determination unit may be fixed in position or may be movably arranged inside the process chamber of the apparatus. The term "fixed" and the term "movable" may refer to an arrangement of the determination device corresponding to a movement relative to the process chamber. Thus, a fixed arrangement may refer to a fixed position in which the determination device is arranged, wherein the position does not change, e.g. over the additive manufacturing process. A movable arrangement or an arrangement in a movable position indicates that the determination device may be moved relative to the process chamber.

For example, a fixed arrangement may be provided by arranging the determination device in a process plane, for example a (bottom) wall delimiting the process chamber. An exemplary movable arrangement may be an arrangement of the determination device in a part of an application unit, for example the application element. As the determination device is arranged on the application unit, the determination device will move together with the application unit relative to the process chamber. As such an application unit usually is moved over the entire build plane, the energy beam can be measured or the at least one parameter of the energy beam can be determined over the entire build plane, as the determination device is moved together with the application unit over the build plane.

Preferably, the apparatus comprises an irradiation device that is adapted to generate and/or guide the energy beam inside the process chamber, in particular in the build plane. The irradiation device may be adapted to move the energy beam synchronous with the application unit, in particular the application element. Thus, as the application element is moved in the application process, in which build material is applied in the build plane, the energy beam can synchronously be moved together with the application element. Hence, a simultaneous application process and determination process of the at least one parameter of the energy beam is feasible.

Further, the inventive apparatus may comprise multiple determination devices, in particular distributed at defined positions over the width of the application unit. Thus, it is possible to have at least two, in particular a plurality of, determination devices, that can be distributed in the build plane. Of course, a combination of at least one fixedly arranged and at least one movably arranged determination device is possible. For example, at least one determination device may be arranged in a fixed position and/or at least one determination device may be arranged in a movable position. Thus, it is particularly possible that multiple determination devices are arranged on the application unit, in particular on the application element. Thus, the multiple determination devices arranged on the application unit are moved together with the application unit over the build plane. Additionally, the provision of at least two determination devices allows for determining the at least one parameter of at least two energy beams simultaneously. For example, a first group of determination devices may be assigned to a first energy beam and a second group of determination devices may be assigned to a second energy beam. Of course, it is also possible to determine the at least one parameter of every energy beam using all determination devices, wherein the determination of the at least one parameter can be performed alternatingly for the at least two energy beams.

The determination device of the inventive apparatus may further be adapted to determine the power of the energy beam, in particular via the first and/or the second determination unit. As described before, the determination of the power of the energy beam (or the intensity of the energy beam) may be used to determine the focal position and/or the lateral position of the energy beam. The determination device may also be adapted to determine the power of the energy beam to provide information on the status of the energy beam, in particular the amount of energy that is currently depleted in a corresponding area (volume) of build material.

The inventive apparatus may further be improved in that the determination device may be adapted to generate calibration data and/or adjustment data based on which the apparatus may be adapted to control the energy beam in a closed loop. Hence, the determined parameter of the energy beam may be used to generate calibration data and/or adjustment data relating to whether the energy beam is properly calibrated and/or adjusted or whether a recalibration or an adjustment of the energy beam is necessary. The generated calibration data and/or adjustment data can be used to control the energy beam in a closed loop. For example, the calibration data and/or adjustment data may be generated via a control unit. Via the control unit the energy beam may be (re-)calibrated or adjusted dependent on the determined parameter.

Thus, if a calibration and/or an adjustment of the energy beam is deemed necessary, the calibration and/or adjustment of the energy beam can be performed based on the generated calibration data and/or adjustment data. After the calibration and/or adjustment of the energy beam has been performed, the results of the calibration and/or adjustment can be verified via another determination of the at least one parameter of the energy beam. Thus, the detected deviations from a defined nominal value of the parameter can compensated via the calibration and/or adjustment of the energy beam.

To ensure that the determination of the at least one parameter is performed "live", the first and/or the second determination unit may comprise a detector that is built as a high repetition rate sensor. This allows for determining deviations and correcting deviations immediately, in particular the processing of the next layer may be performed considering the calibration and/or adjustment of the energy beam based on the calibration data and/or adjustment data.

Besides, the invention relates to a determination device, in particular for an inventive apparatus, as described before, wherein the determination device is arrangeable or arranged inside a process chamber of the apparatus and is adapted to determine at least one parameter of the energy beam that is generated or can be generated via the apparatus, preferably during an additive manufacturing process, in particular during a process step in which build material is applied onto a build plane of the apparatus.

Further, the invention relates to a method for operating at least one apparatus for additively manufacturing three-dimensional objects by means of successive layerwise selective irradiation and consolidation of layers of a build material which can be consolidated by means of an energy beam, in particular an inventive apparatus, as described before, wherein at least one parameter of the energy beam is determined via a determination device, in particular an inventive determination device, as described before, that is arranged inside a process chamber of the apparatus, preferably during an additive manufacturing process, in particular during a process step of the additive manufacturing process in which build material is applied onto a build plane of the apparatus.

Self-evidently, all features, details and advantages that are described with respect to the inventive apparatus are fully transferable to the inventive determination device and the inventive method. The inventive method may in particular be performed on an inventive apparatus, preferably using an inventive determination device.

BRIEF DESCRIPTION OF THE DRAWINGS

Exemplary embodiments of the invention are described with reference to the Fig. The Fig. are schematic diagrams, wherein.

DETAILED DESCRIPTION

Figure 1:
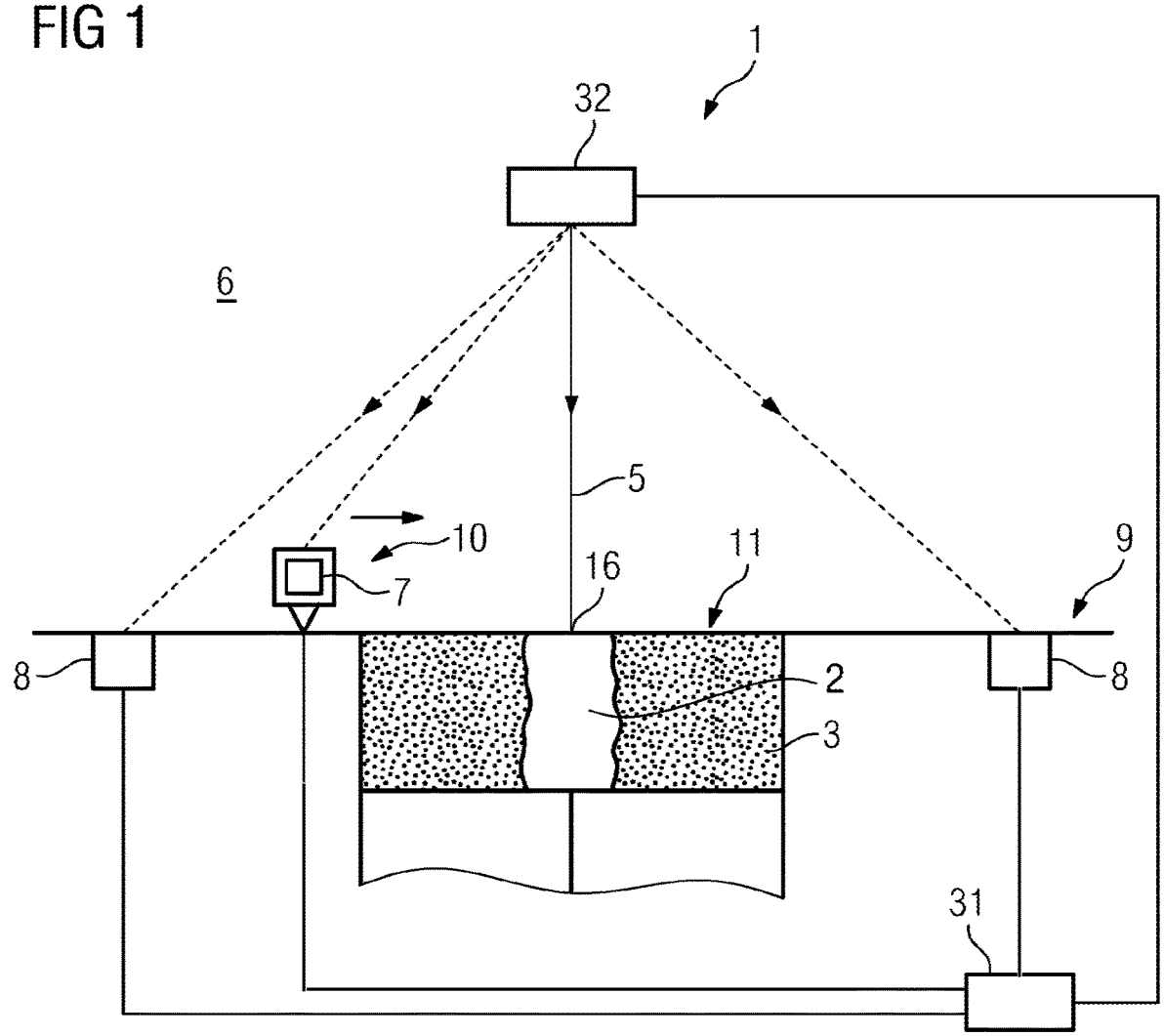
FIG. 1 shows an inventive apparatus in side view.

FIG. 1 shows an apparatus 1 for additively manufacturing of three-dimensional objects 2 by means of successive layerwise selective irradiation and consolidation of layers of build material 3 which can be consolidated by means of an energy beam 5 that is guided inside a process chamber 6 of the apparatus 1. The apparatus 1 comprises determination devices 7, 8 that are adapted to determine at least one parameter of the energy beam 5. Thus, the energy beam 5 may be generated and guided via an irradiation device 32, in particular in that the energy beam 5 is incident on the determination devices 7, 8. The energy beam 5 incident on various determination devices 7, 8 is depicted via dashed lines to emphasize that the energy beam 5 can be guided to each of the determination devices 7, 8. As can be derived from FIG. 1, the determination devices 7, 8 are arranged inside the process chamber 6.

Figure 2:
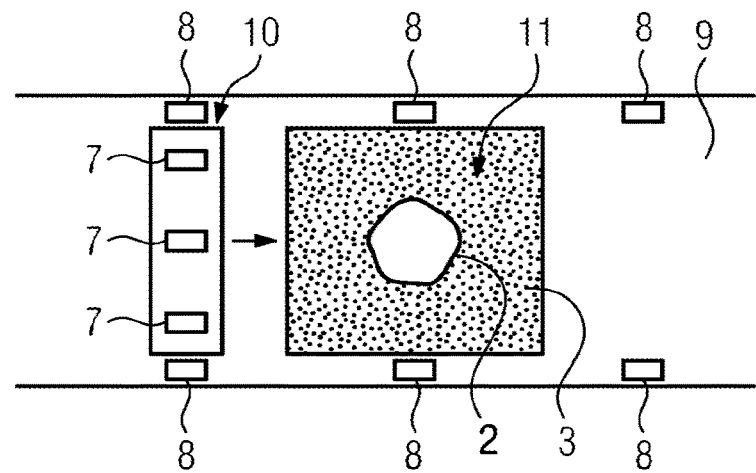
FIG. 2 Shows the inventive apparatus in top view.

The determination devices 7 (FIG. 2) are arranged on an application unit 10, in particular on an application element, such as a coater, of the application unit 10. According to this exemplary embodiment, three determination devices 7 are arranged in defined positions on the application unit 10, in particular over the width of the application unit 10, wherein the determination devices 7 are equidistantly distributed over the width of the application unit 10.

The determination devices 8 are arranged in fixed positions in a process plane 9 that is a bottom wall delimiting the process chamber 6. The determination devices 8 are arranged in defined positions that are distributed over the process plane 9, in particular along the sidelines delimiting a build plane 11. The build plane 11 is a plane in which build material 3 is directly irradiated via the energy beam 5. Of course, it is arbitrary to combine at least one determination device 7 and/or at least one determination device 8, in particular determination devices 7, 8 that are fixed in position or movable, in particular together with another functional component of the apparatus 1, such as the application unit 10.

The irradiation device 32 is preferably adapted to guide the energy beam 5 synchronous with the application unit 10 in that the determination devices 7 can determine the at least one parameter of the energy beam 5 while an application process step in which fresh build material 3 is applied onto the build plane 11. Advantageously, all determination devices 7, 8 can be used during an additive manufacturing process in which an object 2 is additively built. It is also possible to have the determination devices 7, 8 separably connected with the apparatus 1, wherein the determination devices 7, 8 may be connected with the apparatus 1 and arranged in the process chamber 6 for performing the determination process and can be disconnected and removed after the determination process is finished.

Figure 3:
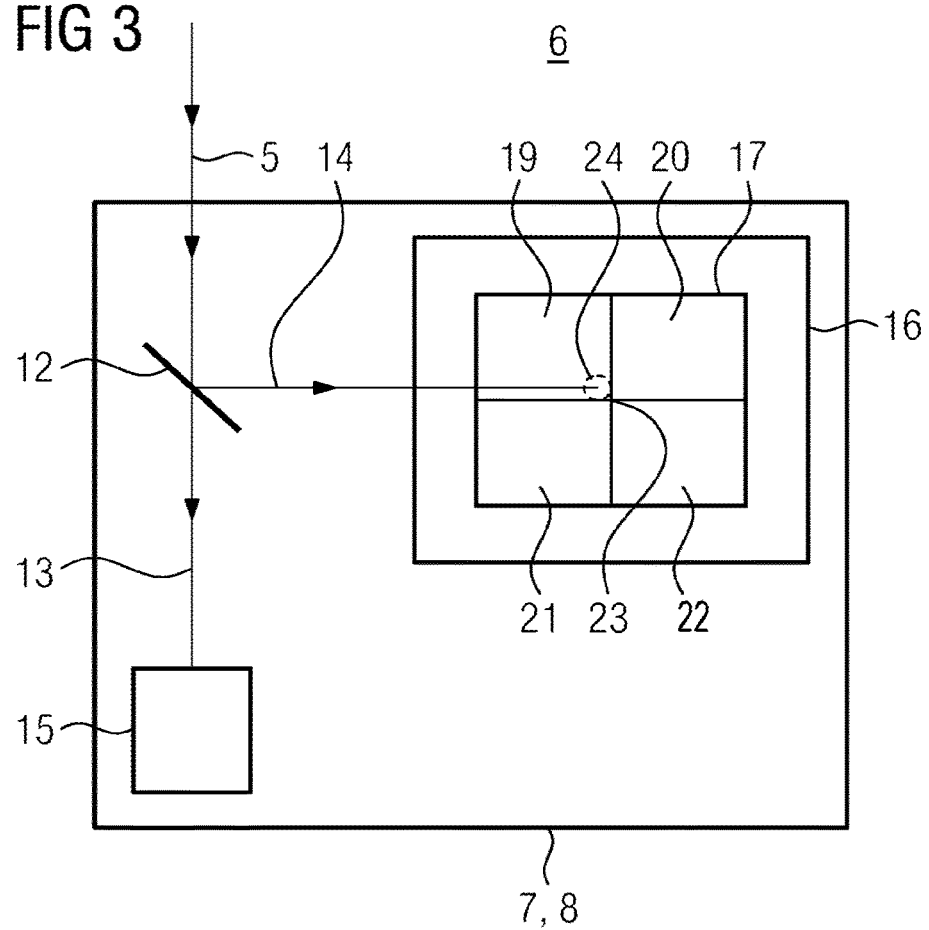
FIG. 3 shows an inventive determination device.

The determination devices 7, 8 are exemplarily described in detail with respect to FIG. 3, 4. FIG. 3 shows a determination device 7, 8 on which the energy beam 5 is incident.

The determination device 7, 8 comprises a beam splitter 12 that is adapted to split the energy beam 5 incident on the beam splitter 12 into a first sub-part 13 and a second sub-part 14. The beam splitter 12 is further adapted to guide the first sub-part 13 to a first determination unit 15 and to guide the second sub-part 14 of the energy beam 5 towards a second determination unit 16. Thus, it is possible that the determination device 7, 8 determines at least two (different) parameters of the energy beam 5 simultaneously.

The second determination unit 16 comprises a detection element 17 that is, in this exemplary embodiment, built as quadrant photo diode. The detection element 17 therefore, comprises four sections 19-22 that are arranged adjacent to each other. The four sections 19-22 abut each other in the center 23 of the detection element 17. Thus, the detection element 17 may indicate or detect onto which of the sections 19-22 the second sub-part 14 of the energy beam 5 is incident. For example, the center 23 of the detection element 17 may be defined as nominal relative position in which the energy beam 5 has to be incident on the detection element 17, if the energy beam 5 is properly guided via the irradiation element 9.

In the situation that is depicted in FIG. 3, the energy beam 14 is incident on the section 19 of the detection element 17. Thus, a deviation between the nominal position and the actual position of the second sub-part 14 of the energy beam 5 is present. Thus, calibration data or adjustment data can be generated to allow for the irradiation device 32 controlling the energy beam 5 in that the deviations between the actual lateral position and the nominal lateral position are reduced or compensated.

As the spot of the second sub-part 14 on the detection element 17, in particular the detection plane of the detection element 17, forms a spot, which is depicted via a dashed circle 24, it is possible that the spot 24 is incident on more than one section 19-22 simultaneously. Thus, for the second sub-part 14 being incident on the center 23 of the detection element 17, it is necessary that each of the sections 19-22 generates the same signal, in particular determines the same intensity of the (circular) second sub-part 14. Thus, via a maximum detection procedure the second sub-part 14 of the energy beam 5 can be guided over the detection element 17 to calibrate the lateral position of the energy beam 5. The nominal lateral position is found, if the ratio of the intensity/spot size of the second sub-part 14 is the same on all four sections 19-22.

Figure 4:
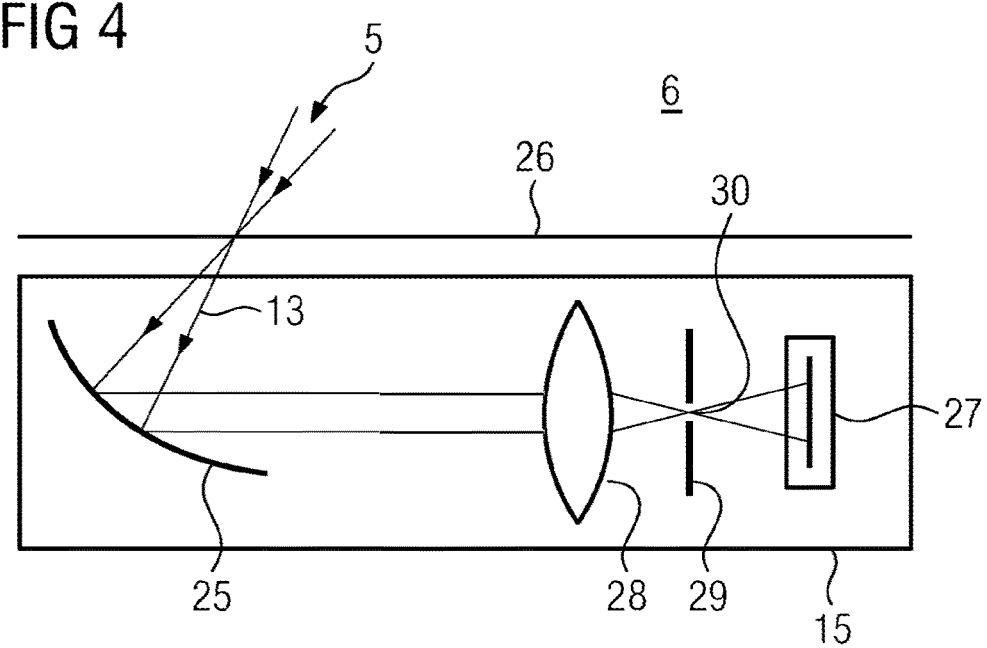
FIG. 4 shows a determination unit of the determination device from FIG. 3.

FIG. 4 shows the first determination unit 15 of the determination device 7, 8, as depicted in FIG. 3. The determination device 7, 8 comprises a collimating unit 25, preferably a parabolic off-axis mirror, that is adapted to collimate the focused energy beam 5, in particular the first sub-part 13 of the energy beam 5, that is incident on the first determination unit 15. As depicted in FIG. 4, the energy beam 5 is focused on a focal position 26, for example the build plane 11. It is also possible to take into calculation that the energy beam 5 incident on the first determination unit 15 is not in the focal plane 26, as, for example if the determination device 7 is arranged in the application unit 10, the determination device 7 will be above the build plane 11. This offset in the position of the determination unit 15 can, of course be taken into calculation. For the sake of simplicity, the first determination unit 15 is depicted as being arranged behind the focal position 26 (in beam propagating direction).

As described before, the collimating unit 25, for example an off-axis parabolic mirror, collimates the focused energy beam 5, in particular the first sub-part 13 of the energy beam 5 and guides the first sub-part 13 towards a detector 27 of the first determination unit 15. Between the collimating unit 25 and the detector 27 a focusing unit 28, for example a lens, is arranged that is adapted to focus the collimated first sub-part 13. Thus, the collimated first sub-part 13 is collimated via the collimating unit 25 and guided towards the focusing unit 28 and is afterwards incident on the detector 27.

Between the focusing optic 28 and the detector 27 an optical filtering unit 29 may be arranged, for example an aperture. Thus, parts of the first sub-part 13 of the energy beam 5 that is not properly focused, in particular, if the energy beam 5 does not meet the nominal focal position 26, at least a part of the first sub-part 13 is filtered at the optical filtering unit 29, as the focal position 30 of the first sub-part 13 will lie before or after the optical filtering unit 29 and is therefore, at least partially incident on the optical filtering unit 29 and therefore, absorbed by the optical filtering unit 29. Thus, a maximum detection procedure can also be performed for the determination of the focal position, wherein the focal position of the energy beam 5 can be varied, wherein the maximum intensity/power determined via the detector 27 indicates the nominal focal position, as in the nominal focal position 26 the focal position 30 of the first sub-part 13 is arranged in the plane of the optical filtering unit 29 allowing the whole first sub-part 13 to pass the optical filter unit 29.

Further, a control unit 31 (FIG. 1), e.g. comprising a central processor unit, may be provided that is adapted to receive the determined parameter from the determination devices 7, 8. The control unit 31 may be adapted to generate calibration data and/or adjustment data, as described before. Thus, it is possible to control the energy beam 5 in a closed loop, as the control of the energy beam 5 via the irradiation device 32 can be performed dependent on the determined parameter. The effect of a corresponding calibration and/or adjustment can again be determined via the determination of the parameter and can subsequently be fed back to the control unit 31.

Self-evidently, the inventive method can be performed on the inventive apparatus 1.

The invention claimed is:

1. An apparatus for additively manufacturing three-dimensional objects by successive layerwise selective irradiation and consolidation of layers of a build material, the apparatus comprising:
   an irradiation device configured to generate and energy beam that is guided inside a process chamber; and
   a determination device movably arranged on an application unit inside the process chamber and adapted to determine at least one parameter of the energy beam during a process step of the additive manufacturing process in which build material is applied onto a build plane of the apparatus, wherein the determination device comprises a beam splitter adapted to split the energy beam incident on the beam splitter from the irradiation device into a first sub-part and a second sub-part, wherein the beam splitter is further adapted to guide the first sub-part to a first determination unit and the second sub-part to a second determination unit, wherein the first determination unit is adapted to determine a focal position of the energy beam and the second determination unit is adapted to determine a lateral position of the energy beam.

2. The apparatus according to claim 1, wherein the second determination unit comprises a detection element adapted to determine a lateral position of the energy beam and/or a deviation from a nominal position.

3. The apparatus according to claim 2, wherein the detection element of the second determination unit comprises a quadrant photo diode.

4. The apparatus according to claim 1, wherein the first determination unit comprises a collimating unit adapted to collimate the first sub-part towards a detector of the first determination unit.

5. The apparatus according to claim 4, wherein the collimating unit comprises an off-axis parabolic mirror.

6. The apparatus according to claim 1, wherein the first determination unit comprises a focusing unit adapted to focus the collimated first sub-part onto a detector of the first determination unit.

7. The apparatus according to claim 1, wherein the first determination unit comprises an optical filtering unit adapted to filter at least one part of the first sub-part with a defined focal position deviating from a nominal focal position.

8. The apparatus according to claim 7, wherein the optical filtering unit of the first determination unit comprises an aperture.

9. The apparatus according to claim 7, wherein the optical filtering unit comprises an aperture.

10. The apparatus according to claim 1, wherein the first determination unit is adapted to perform a maximum detection procedure to determine the at least one parameter of the energy beam.

11. The apparatus according to claim 10, wherein the at least one parameter of the energy beam comprises a deviation from a nominal focal position.

12. The apparatus according to claim 1, further comprising at least one further determination device fixedly arranged in a defined position inside the process chamber.

13. The apparatus according to claim 1, wherein an irradiation device of the apparatus is adapted to move the energy beam synchronous with the application unit.

14. The apparatus according to claim 1, wherein the apparatus comprises a plurality of determination devices.

15. The apparatus according to claim 14, wherein the plurality of determination devices are distributed at defined positions over the width of the application unit.

16. The apparatus according to claim 1, wherein the determination device is adapted to determine the power of the energy beam via at least one of the first or second determination units.

17. The apparatus according to claim 1, wherein the determination device is adapted to generate calibration data and/or adjustment data based on which the apparatus is adapted to control the energy beam in a closed loop.

18. A method for operating at least one apparatus for additively manufacturing three-dimensional objects by successive layerwise selective irradiation and consolidation of layers of a build material, the method comprising:
   determining, with a determination device movably arranged on an application unit inside a process chamber of the apparatus, at least one parameter of the energy beam during a process step of the additive manufacturing process in which build material is applied onto a build plane of the apparatus;
   generating, with an irradiation device, an energy beam that is guided inside the process chamber;
   splitting, with a beam splitter of the determination device, the energy beam incident on the beam splitter from the irradiation device into a first sub-part and a second sub-part;
   guiding, with the beam splitter, the first sub-part to a first determination unit and the second sub-part to a second determination unit;
   determining, with the first determination unit, a focal position of the energy beam; and
   determining, with the second determination unit, a lateral position of the energy beam.

* * * * *